T. NEW.
Water-Proof Cellar.
No. 8,387. Reissued Aug. 20, 1878.
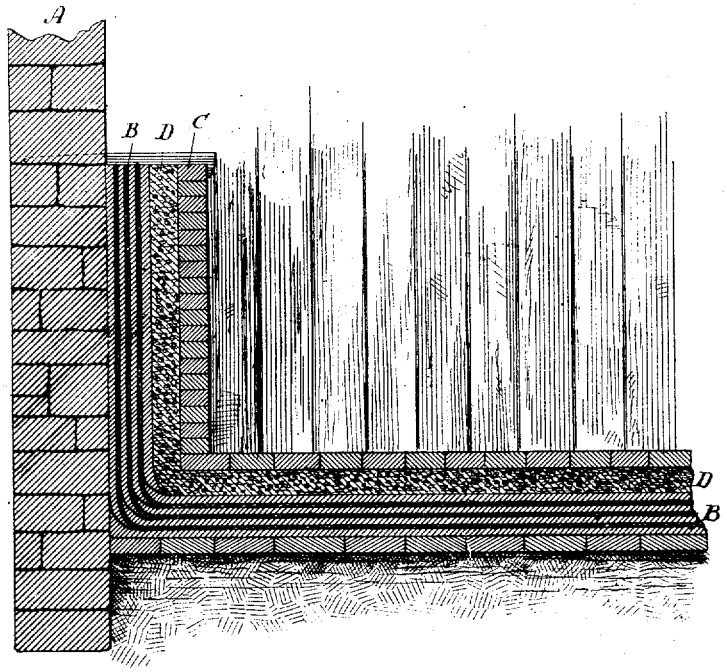
Witnesses:
C. Clarence Poole
M. F. Morsell
Inventor:
Tobias New
per attys.
A. H. Evans & Co.

UNITED STATES PATENT OFFICE.

TOBIAS NEW, OF BROOKLYN, NEW YORK.

IMPROVEMENT IN WATER-PROOF CELLARS.

Specification forming part of Letters Patent No. 113,328, dated April 4, 1871; Reissue No. 7,920, dated October 23, 1877; Reissue No. 8,387, dated August 20, 1878; application filed August 12, 1878.

*To all whom it may concern:*

Be it known that I, TOBIAS NEW, of Brooklyn, in the county of Kings and State of New York, have invented a new and useful Improvement in Constructing Sanitary Water-Proof Cellars, Cisterns, &c.; and I do hereby declare that the following is a full, clear, and exact description thereof, which will enable others skilled in the art to make and use the same, reference being had to the accompanying drawing, forming part of this specification.

This invention relates to a new and useful improvement in the construction of sanitary and water-proof cellars, cisterns, vaults, reservoirs, and all underground apartments for whatever purpose, whereby bottom and walls of such cellars and other places above mentioned are kept in a sanitary condition, and are made perfectly impervious to water.

The invention consists in the use of successive layers of roofing-felt and asphaltic or roofing cement, associated with a layer of concrete or hydraulic cement, combined with gravel or other layers of equivalent material, applied as hereinafter more fully described.

The accompanying drawing is a vertical section of cellar with the bottom and walls constructed according to my invention.

My invention is not limited to the particular combination of the materials heretofore mentioned and used as hereinafter set forth. I prefer, however, the following combination and use of such materials as is contained in the accompanying drawing and following description of the same and direction for carrying out the same.

In the particular combination referred to, A represents a cellar-wall, on the inner side of which I commence to place my water-proof layers of cement and felting. B represents the felting. B also represents the layers of roofing or asphaltic cement. C represents an inner wall of brick, stone, or wood, sufficiently strong and substantial to withstand any expected pressure of water from without. D is a layer of hydraulic concrete between the cement layers and the wall C. This layer of hydraulic cement may or may not be employed, as may be deemed advisable.

In carrying out my invention according to the particular combination of materials shown in diagram, and herein described, I commence with the bottom, which I prepare by smoothing it off and making a tolerably even surface by means of concrete or otherwise, and then apply alternate layers of roofing-cement and roofing-felt or of equivalent material. In this manner I apply four layers, more or less.

To enable the bottom thus formed to withstand the upward pressure of water, I weigh down or ballast the bottom in any convenient manner. The walls of the cellar, cistern, &c., I construct in a similar manner.

The surface, whether of stone or of other material, having been made sufficiently even, the cement is first applied, and then successive layers of the felt and cement, with the inner wall or bulwark of stone, brick, or wood, which inner wall is placed directly against said layers of felt and cement, and anchored to the outer wall at the top, and either with or without the intervening layers of hydraulic concrete, as may be deemed best. At the angles or corners of the cellar or like place the layers of the felt on the bottom and on the sides may lap past each other, if desired, so that the wall and the bottom may be firmly united and a tight and water-proof joint be insured in every part.

As already stated, I do not limit myself to the particular combination and application of such materials as herein described. The especial and most useful feature in my invention is the use of the layers of roofing-felt and the layers of asphaltic or roofing cement.

The adjacent layers of concrete or cement, of kinds commonly known to and used by masons for such purposes, while to some degree impervious, are mainly for securing solidity and weight to the structure. The layers of roofing-felt and asphaltic cement are most effective when alternated and having the masonry or concrete or cement mainly superimposed.

A prime advantage of these layers of roofing-felt and asphaltic or roofing cement, however used or associated, is the disinfecting quality, as well as water-repellent property of the same, there being hardly so powerful a disinfectant known for such uses as these layers furnish.

It has long been greatly desired to find some means of resisting and counteracting not only the moisture, but the gases and malarial influences and other causes of disease so frequently generated in cellars and so familiarly known. These layers of felt and asphaltic material above described are believed to be the best means known for the purpose.

A large economy and great pecuniary advantage is obtained by this use of my invention in reclaiming old, useless, and pestilential cellars, as well as in the construction of new ones, thus very largely increasing the value and rent of real property where the same is used. It not only excludes the moisture, but also destroys and prevents the generation of such gases and vapors.

Cellars constructed according to my invention are not only water-proof, but are highly sanitary.

The most essential feature of my invention is the use of the layers of roofing-felt and of asphaltic or roofing cement, as above described, and protected and having the advantages as above set forth.

Having thus described my invention, I claim as new and desire to secure by Letters Patent—

In sanitary water-proof cellars, cisterns, vaults, reservoirs, and similar underground receptacles formed with a solid or suitable foundation, the combination of layers of roofing-felt and of asphaltic or roofing cement, substantially as I have above described, with a layer of concrete, cement, stone, or other suitable material for the protection of the roofing felt and asphaltic or roofing cement, and to aid in resisting water-pressure or noxious gases, where the same exist, substantially as and for the purpose above set forth.

TOBIAS NEW.

Witnesses:
NATHAN DUFF,
P. J. KEATING.